Nov. 28, 1939.　　　　E. H. PIRON　　　　2,181,570

TROLLEY BASE

Filed Oct. 31, 1936

INVENTOR
Emil H. Piron
BY
J. Hudson Davis
ATTORNEY

Patented Nov. 28, 1939

2,181,570

UNITED STATES PATENT OFFICE 2,181,570

TROLLEY BASE

Emil H. Piron, New York, N. Y., assignor to Transit Research Corporation, New York, N. Y., a corporation of New York Application October 31, 1936, Serial No. 108,567

3 Claims. (Cl. 248—350)

This invention relates to a trolley base platform for use on trolley cars and has for its object to provide an improved platform construction which will be more rugged and more economical to build, and to support this platform in such manner that short wave vibrations will not be transmitted from the trolley pole to the roof of the car.

In the construction of the new type street cars quietness of operation has been approached. After elimination of many major noises it became apparent that a roof rumble was being caused by the trolley and that the vibrations causing this rumble were both long and short vibrations. Padding as by rubber in compression and the like were tried with somewhat improved results, however, it was found that in order to damp out all undesirable vibrations it was necessary that the supporting means have a low load deflection ratio. It is therefore a principal object of this invention to provide a platform support which will be capable of substantial deflection under loading and which will, by virtue of the material used inherently act as a sound deadening means.

More specifically it is an object to provide a trolley platform and supports thereof in the form of rubber shear springs.

Another object is to provide shear spring supports for the platform and to so arrange these supports that they will be stable during car operation.

Other objects and advantages will become hereinafter more fully apparent as reference is had to the accompanying drawing wherein my improved apparatus is diagrammatically illustrated and in which—

Figure 1:
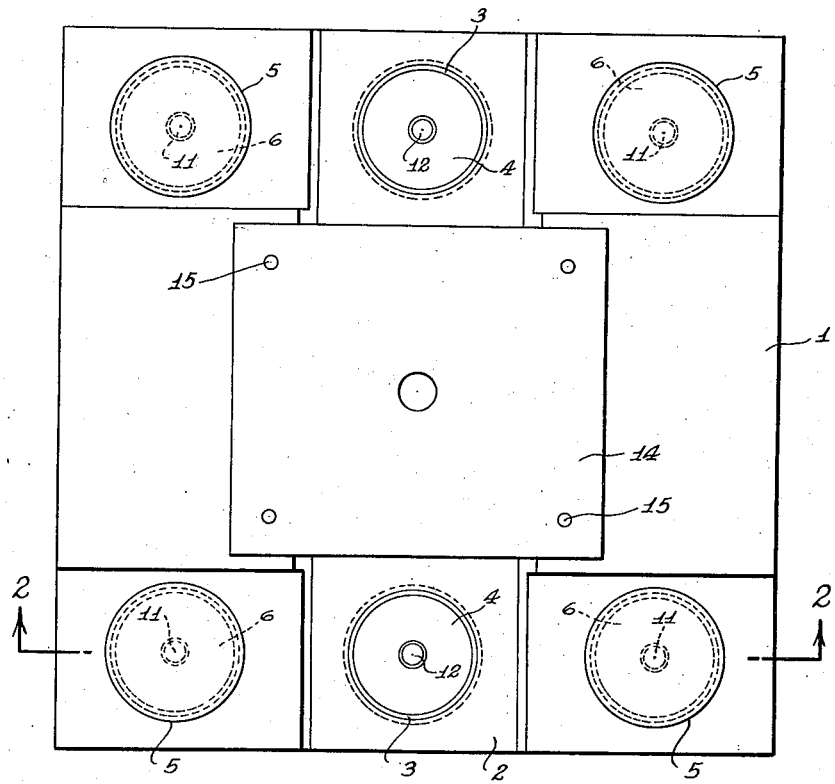
Fig. 1 is a plan view of a trolley platform.
Figure 2:
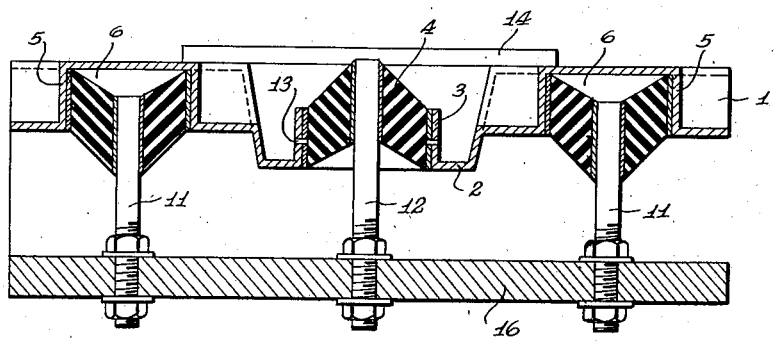
Fig. 2 is a vertical section taken along the line 2—2 of Fig. 1.
Figure 3:
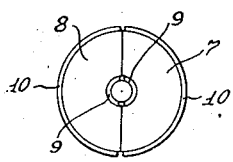
Fig. 3 is a plan view of two spring segments in abutting assembled relation.

I indicates a sheet of metal or other suitable material which is of rectangular shape with a trough or depression extending the length thereof parallel to two opposite sides and midway therebetween. Near each end of this depression 2 the metal is punched and drawn into cylindrical openings 3 for the reception of cylindrical shear springs 4 of elastic material.

The four corners of the sheet are each provided with cup-shaped formations 5 to receive shear springs 6.

The springs 4 and 6 may be of the same diameter and of interchangeable parts. Each spring is composed of two segments or semi-cylinders 7 and 8 of rubber each surface bonded at its inner and outer surfaces to the stiff segments or shells 9 and 10. The shells 10 total less than 360° in circumference as do also the shells 9 so that when two spring segments are assembled about the central shaft 11 or 12 pressure may be imposed on the rubber and transmitted by the shells 9 to the shaft. The retainers 3 and 5 are of such diameter that the shells 10 must be pressed toward each other thereby imposing substantial compression on the rubber, for insertion thereinto. The outer shells 10 therefore have frictional engagement with the retainer walls. In the case of the open ended cylinder 3 one or more pins 13 may be added if necessary. The shafts 11 and 12 also have frictional engagement with the shells 9.

In order to complete the base or platform a plate 14 spans the depression 2 and is secured to each bank thereof by bolts or rivets 15. This plate is adapted to carry a trolley base of conventional or special type.

The shafts 11 and 12 are threaded at their lower ends for attachment to a car roof 16. The springs 6 support the weight of the base and the trolley bar while the springs 4 are given an initial deflection in order to maintain the springs 6 under substantial continuous deflection thus adding stability. The rubber segments of the springs 6 are therefore inverted with respect to the segments of the springs 4.

It will be understood that the particular shape of the platform or of the plates 1 and 2 may be substantially altered without departing from the spirit of my invention and I therefore desire to be extended protection within the scope of the appended claims.

What I claim is:

1. The combination of a trolley base platform having a downwardly facing cup-shaped depression at each corner thereof, a cylindrical rubber shear spring in each of said depressions, said springs each comprising segments, each of said segments comprising a semicylinder of rubber and a metallic shell over the outer surface thereof, each of said shells being slightly less than 180° in circumference whereby the rubber segments may be placed under compression upon assembly thereof, said cup-shaped depressions each being of such diameter that said metallic shells are in pressure engagement therewith when said springs are inserted therein.

2. A trolley base platform comprising a metallic plate member having a central trough-like depression extending the length thereof, spring retaining means at each corner thereof, an elastic shear spring for each of said retainer means, and a second plate member spanning said depression and attached to the first named plate member being adapted for attachment of a trolley base.

3. A trolley base platform comprising a metallic plate member having a central trough-like depression extending the length thereof, said depression having circular openings near the ends thereof, the walls of said openings constituting retainer means for elastic shear springs, the corners of said member having downwardly facing cup-shaped openings each having a cylindrical spring therein, and a second plate adapted for attachment of a trolley base spanning said depression and secured to the first named plate at each side of said depression, the springs in the cup-shaped openings being adapted to sustain the weight of said plates and the trolley base together with such forces as are transmitted thereto during operation, the springs in said circular openings being set to impose additional loadings on the other springs whereby said other springs are maintained under substantial continuous deflection.

EMIL H. PIRON.